June 24, 1969  P. S. E. FREDRIKSSON ET AL  3,451,123
METHOD FOR CONTINUOUSLY ROLLING WIRE BILLETS INTO
WIRE OR RODLIKE MATERIAL
Filed Jan. 31, 1967

United States Patent Office 3,451,123
Patented June 24, 1969

3,451,123
METHOD FOR CONTINUOUSLY ROLLING WIRE BILLETS INTO WIRE OR RODLIKE MATERIAL
Per Sven Engelbrekt Fredriksson and Olof Alvar Granström, Vasteras, Sweden, assignors to AB Svenska Metallverken, Vasteras, Sweden
Filed Jan. 31, 1967, Ser. No. 612,920
Claims priority, application Sweden, Feb. 1, 1966, 1,261/66
Int. Cl. B21b 15/00
U.S. Cl. 29—475          1 Claim

ABSTRACT OF THE DISCLOSURE

A method for producing continuous lengths of rod or wirelike material from a number of separate starting billets. The billets are rolled in succession down to bendable dimensions and passed back through stationary joining means wherein the tail end of a preceding shape is joined to the leading end of a following shape and during which the following shape extends into a wide loop, supported by specially arranged planes.

Background

The present invention relates to a method in continuously rolling separate wire billets in sequence into wire or rodlike material.

When rolling billets into wire or rodlike material it is the usual practice to use billets of both reasonable and manageable dimensions. The billet is then rolled in a sequence of rolling operations down to the final dimension of the required wire or rodlike material. The length of wire or rod material obtained from each individual billet has thus been restricted and when long continuous lengths of such material were required it was necessary to weld together the ends of the materials derived from the different billets. Since high requirements are placed on quality it is necessary to cut relatively long pieces of material from the leading and trailing end of each wire or rod, when tolerance errors, including differences in hardness, conductivity, strength, etc., are found in said ends.

In connection with the ever-increasing demand for unlimited ready weights of wire and rod, attempts have been made to work in continuous sequences and to join together shapes or the like following in sequence to the rolling process. For this purpose, however, it has been necessary to use mobile joining apparatus, e.g. of the so-called "flying type" which must follow the shape or the like for the time taken to effect the join, since it is not possible to stop the rolling operation to join adjacent ends of the shapes.

Among the suggestions previously, advances were electric joining machines as well as mechanical forge welding, impact welding and compression welding machines. For constructive reasons, such machines must possess considerable mass which must be accelerated and retarded, resulting in considerable power consumption and high mechanical stresses. Further, it is necessary to attach connecting conduits to the said mobile machines, the said connecting conduits of necessity being flexible and as a result subjected to forces which cause the material to fatigue rapidly and to wear in general, while at the same time a great deal of room in the workshop must be allotted for the necessary path of movement of the machines.

In this context it is thus a desire to utilize stationary joining machines but then difficulties are found in maintaining continuous operation of the rolling mill since the rolled material must be stopped periodically when adjacent ends of different shapes pass into the stationary joining machine.

A simple but effective solution to this problem is obtained by means of the invention which is mainly characterized in that the billet is rolled down to a dimension which allows the formed shape or section to be bent back and that said shape or section is bent to form a loop, the leading end of which is temporarily stopped in the advancing direction and joined with the stationary rear end of a preceding shape or section, during which operation the loop is allowed to grow. The preceding shape, section or the like is similarly bent into a loop and continuously consumed by a connecting rolling mill line, the joined ends being released for continued movement, the next following loop which has expended out during the said intervals being consumed and the process repeated.

The invention will be more closely described below with reference to an embodiment of the same shown diagrammatically on the drawing, further characterizing features of the invention being disclosed in conjunction therewith.

Detailed description of invention

Figure 4:
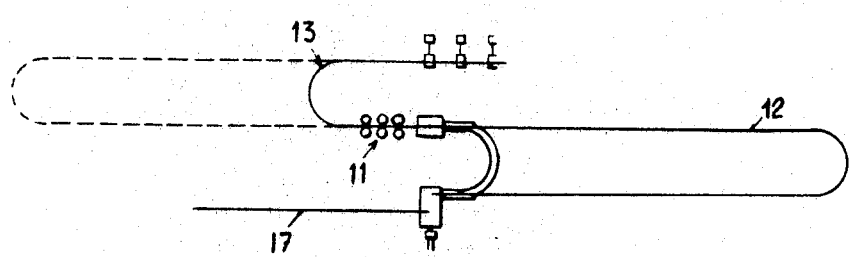

FIGURE 4 finally shows a final position in the joining process between two consecutive shapes, sections or the like.

In the drawing is shown a three-high rolling mill 1 which, via a transmission means 2 and a gear 3, is driven by two electric motors 4 and 5.

The reference numeral 6 indicates a heating furnace into which separate billets are fed in a determined sequence, in the direction of the arrow A and advanced transversely for final discharge. In this connection it can be mnetioned that the method and the arrangement may be applied to cold rolling as well as hot rolling processes, although in all probability the application will be more predominant in the case of hot rolling. The separate billets are fed out of the hot furnace 6, one at a time in several passes, backwards and forwards in the direction of arrows B and C.

The reference numeral 7 represents a stationary joining machine, suitable for the purpose in question. This machine may be of the impact welding, compression welding, or forge welding type or may also be an electric welding machine of a type suitable for the purpose. Extending between the starting point 8 of the pre-rolling mill 1 and the joining machine is a repeater chute or the like 9 serving the reverse the billet which has been pre-rolled down to dimensions at which it can be bent, so that its end is guided into the joining machine 7 to be stopped therein in close proximity to the end of a preceding shape 10 or the like. Located in front of the joining machine are feeder rolls, generally indicated by the reference numeral 11, the feeding movements of which are coordinated in a suitable manner with the operation of the joining machines. These feeder rolls, which are driven, are intended to advance the joined adjacent shapes as soon as the joining operation has been terminated. The shape which is discharged at 8 and reversed in the guide 9 will naturally extend in length as a result of its end being temporarily stopped in the machine 7, the guide 9 being so arranged that portions of the same can be removed or that the shape be thrown out of the guide so that the rolled billet can continue in the direction of arrow D and form a loop 12, substantially corresponding in volume to the volume of the starting billet. On the left hand side of the joining machine 7 the preceding shape, section or the like 10 also extends out into a loop 13, one part of which is fed, in the direction of arrow E, through a rolling mill line generally indicated at 14 and comprising a plurality of roll stands with successively arranged reduction; material leaving the rolling mill line in the direction of arrow F is coiled on drums 15.

Figure 1:
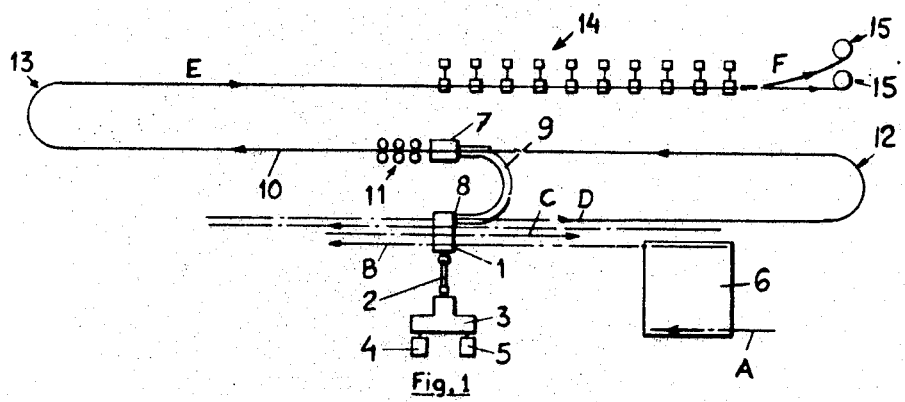
FIGURE 1 is a diagrammatic plan view of a wire rolling mill, e.g. for producing aluminium wire, constructed according to the invention for carrying out the process according to the same.
Figure 2:
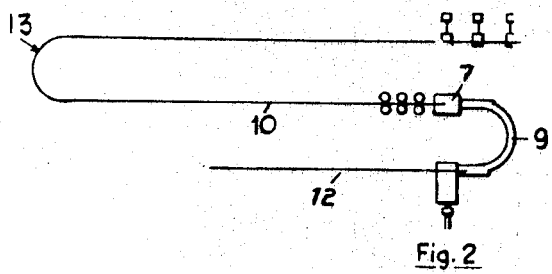
FIGURE 2 shows the left-hand portion of FIGURE 1 in an intermediate position during the process.
Figure 3:
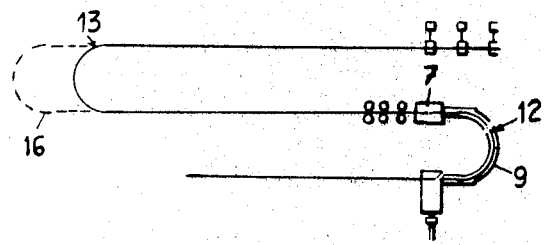
FIGURE 3 shows a further intermediate position in the process.

To illustrate certain stages in the process more clearly reference is made to FIGURES 2–4. FIGURE 2 shows a stage in the sequence where the tail end of the shape 10 has just stopped in the joining machine 7. The loop 13 has then extended substantially into its maximum length, and rolling of the subsequent shape is started at the same time.

FIGURE 3 shows a later stage where the loop 13, as indicated by dotted lines 16, is reduced somewhat and the next following shape 12 is reversed in the repeater and its leading end introduced into the joining machine 7. Joining of the ends of the two shapes, following in sequence, is now effected for a certain period of time.

FIGURE 4 shows a stage where joining of the two ends has just terminated, the loop 13 approaching its minimum length and the loop 12 of the subsequent shape approaching its maximum length. At this stage the ends of the joined shapes are released in the joining machine, the feeding mechanism 11 being started up. A following shape 17 is now on the way to adopt the same position as that of shape 12 in the stage shown in FIGURE 2. The feeding mechanism 11 advances the material with a considerably higher speed than the rolling speed, and the loop 13 rapidly obtains its maximum length while the loop 12 is completely consumed in the line, the last end of the loop 12 rapidly adopting the position occupied by the tail end of the shape 10 in the stage shown in FIGURE 2. The process is repeated with all subsequent shapes.

As can be seen from the drawing the parts of each loop and also the loops themselves are advanced substantially parallel to one another. Although not shown it is understood that loop planes are arranged to support the two loops.

The invention is not restricted to the illustrated and described embodiment but can be varied within the scope of the following claim.

What is claimed is:
1. A continuous method for producing rodlike material directly from separate billets, said method comprising introducing billets into a furnace where the billets are heated to a temperature sufficient for rolling, feeding said billets, when reaching said temperature, in succession to a roughing mill where the billets are reduced in cross-sectional area in a number of parallel passes until the shape of the billet passing the last pass has a cross-sectional area which permits the shaped billet to be bent, positively bending the front end of the shaped billet leaving the roughing mill backwards to form a loop in which the front end of the billet lies parallel with the remainder of its length, holding said front end of the billet stationary and concurrently joining the front end to the rear end of a preceding shaped billet also held stationary while feeding the remaining portion of the shaped billet leaving the roughing mill to form a loop by the force exerted to the shaped billet as it passes through the last pass in the roughing mill, and releasing the rear end of the preceding shaped billet which has been formed with a loop beyond the location where the billets are joined, and has been passed into and through a final rolling line during the joining of the ends of the shaped billets, the total length of material in the latter said loop being at least equal to the length of the shaped billet taken up by the rolling line during the joining operation.

References Cited

UNITED STATES PATENTS

| | | | |
|---|---|---|---|
| 1,932,750 | 10/1933 | Rendleman | 72—230 |
| 2,214,618 | 9/1940 | Kenyon et al. | |
| 2,306,750 | 12/1942 | Rendel | 72—8 |
| 2,662,271 | 12/1953 | Greenberger | 72—227 |
| 3,239,909 | 3/1966 | Shaffer et al. | 29—33 |

FOREIGN PATENTS 1,123,450   6/1956   France.

CHARLES W. LANHAM, *Primary Examiner.*

A. RUDERMAN, *Assistant Examiner.*

U.S. Cl. X.R.

29—33, 493; 72—227, 230